United States Patent [19]

Jones et al.

[11] Patent Number: 4,684,041
[45] Date of Patent: Aug. 4, 1987

[54] SOLID PARTICLE DISPENSING

[75] Inventors: Ronald D. Jones; Joseph B. Cross, both of Bartlesville, Okla.

[73] Assignee: Phillips Petroleum Company, Bartlesville, Okla.

[21] Appl. No.: 722,884

[22] Filed: Apr. 12, 1985

[51] Int. Cl.⁴ .............................................. B67D 5/64
[52] U.S. Cl. .................... 222/161; 222/196; 222/198
[58] Field of Search ............... 222/161, 162, 198, 199, 222/200, 459, 196; 366/111, 112, 114; 209/233, 240

[56] References Cited

U.S. PATENT DOCUMENTS

| 915,078 | 3/1909 | Devermann | 209/355 |
|---|---|---|---|
| 1,455,660 | 5/1923 | Ranz | 209/240 X |
| 1,542,430 | 10/1924 | Wever | 222/189 |
| 1,566,746 | 12/1925 | Herman | 222/200 |
| 2,163,766 | 6/1939 | Spencer | 209/244 |
| 2,412,425 | 10/1946 | Rawson | 209/240 X |
| 2,729,363 | 1/1956 | Bauer et al. | 222/189 |
| 3,254,766 | 6/1966 | Anderson | 209/245 |
| 3,288,287 | 11/1966 | Rhodes | 209/245 |
| 3,485,364 | 12/1969 | Burrough | 209/245 |
| 3,963,605 | 6/1976 | Seaburn | 209/2 |
| 4,030,639 | 6/1977 | Parish | 222/189 |
| 4,248,539 | 2/1981 | Glocker | 366/341 |
| 4,470,525 | 9/1984 | Daw et al. | 222/200 |

Primary Examiner—Robert J. Spar
Assistant Examiner—Jay I. Alexander
Attorney, Agent, or Firm—William R. Sharp

[57] ABSTRACT

An apparatus and method of dispensing solid particles are provided wherein a screen unit is movably disposed within a hopper for containing solid particles to be dispensed. Vibration of the hopper causes the screen unit therein to move relative to the hopper so as to assist in the prevention of plugging of the hopper.

3 Claims, 4 Drawing Figures

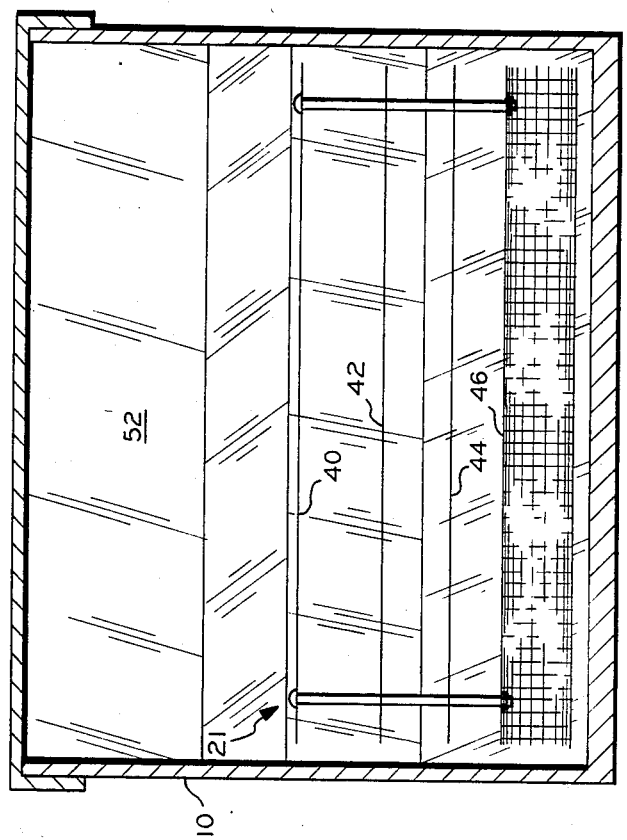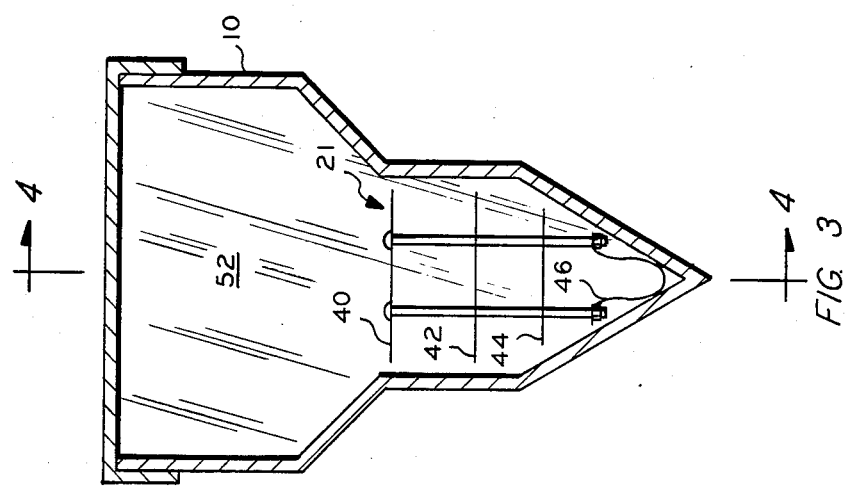

SOLID PARTICLE DISPENSING

BACKGROUND OF THE INVENTION

This invention relates to an apparatus and method for dispensing solid particles.

Many processes require the controlled dispensing of solid particles, i.e. fine grained particulate solids or powders. For example, in sample/reagent preparation, sample materials in particulate or powder form are typically dispensed in a controlled fashion to a vial or other container for weighing or subsequent processing. Commercially available dispensers suitable for such a purpose typically include a hopper and a vibrator for vibrating the hopper at a high frequency so as to move the powder therein through a hopper outlet. One serious limitation of such commercially available dispensing systems is the relatively small capacity, typically around 100 cc, of the hopper. This small hopper capacity requires frequent manual refilling of the hopper where a large amount of solid pariculate is desired to be dispensed continuously, thus resulting in inconvenience and loss of valuable man hours.

It has been found that enlarging the capacity (to for example 500–1000 cc) of the hopper in an attempt to overcome the above described problems caused many fine grain powders to pack in the hopper, particularly at the bottom of the hopper, thus effectively terminating particle flow. Moreover, some packing problems have even been observed employing the small capacity hopper where it is substantially filled with solid material.

SUMMARY OF THE INVENTION

It is, therefore, an object of the invention to provide an apparatus and method of dispensing solid particles.

It is also an object of the invention to provide an apparatus and method of dispensing solid particles wherein a hopper having a capacity larger than in prior systems can be employed, substantially without packing of the solid material in the hopper which can cause termination of particle flow.

The above objects are realized in an apparatus which includes a hopper and a screen means disposed therein. The screen means includes at least one screen member, and is capable of movement relative to the hopper in response to movement of the hopper.

According to another aspect of the invention, there is provided a method of dispensing solid particles wherein a hopper is vibrated which is at least partially filled with solid particles, and wherein the hopper has disposed therein at least one screen member which is capable of movement relative to the hopper. Vibration of the hopper causes the screen member to move relative to the hopper. At least a portion of the solid particles in the hopper is allowed to pass through a hopper outlet.

The above mentioned movement of the screen means relative to the hopper assists in breaking up any packed areas of solid particles within the hopper. Thus, the present invention enables utilization of a larger capacity hopper than in prior art dispensing systems.

BRIEF DESCRIPTION OF THE DRAWINGS

FIG. 3 is a lateral cross-sectional view of the hopper and associated screen unit shown in FIG. 1.

FIG. 4 is a cross-sectional view of the apparatus shown in FIG. 3 as viewed along 4—4.

DESCRIPTION OF THE PREFERRED EMBODIMENTS

One embodiment of an apparatus for dispensing solid particles will now be described with reference to the figures. This apparatus is particularly suitable for the dispensing of fine grain reagents such as lithium tetraborate and potassium pyrosulfate used in sample/reagent preparation. It should be understood, however, that the apparatus as described below could be employed to dispense virtually any type of solid particulate.

Figure 1:
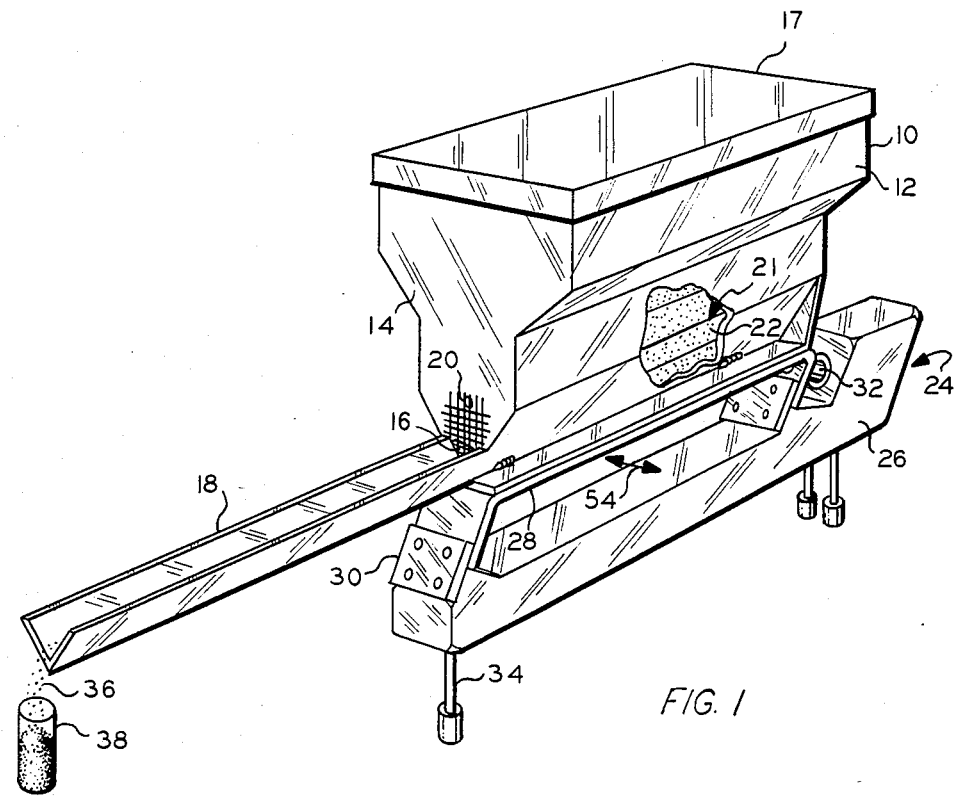
FIG. 1 is an illustration of one embodiment of an apparatus according to the invention which includes a hopper having a portion broken away to reveal a screen unit disposed therein.

Referring now to FIG. 1, the illustrated apparatus includes a hopper 10 for containing solid particles therein, and from which these particles are dispensed. Hopper 10 can be constructed of any suitably sturdy material which is compatible with the solid particles being dispensed. In most instances a metallic construction is preferred. As used herein, the term "hopper" is defined simply as a receptacle for containing and delivering material therefrom, and does not imply any particular shape. As shown, hopper 10 of the illustrated embodiment has an upper end of larger cross-section than the lower end, and includes a side wall 12 and an end wall 14. Another side wall and end wall form the remainder of hopper 10, but are not shown in FIG. 1. End wall 14 defines an outlet opening 16 near the lower end of hopper 10, wherein outlet opening 16 is in communication with a chute 18 which is integrally connected to hopper 10 at end wall 14. A screen 20 is suitably mounted to end wall 14 so as to cover outlet opening 16. Screen 20 serves a sifting function in preventing excessively large particles from exiting outlet 16. A removable hopper lid 17 is also provided which smugly fits over the upper end of hopper 10 so as to prevent undesirable discharge of solid particulate from the hopper during operation.

As shown, a portion of hopper side wall 12 is broken away to reveal a portion of a screen unit 21 disposed therein. This screen unit 21 will be described in detail with reference to FIGS. 2–4. Also shown in FIG. 1 are solid particles 22 which at least partially fill hopper 10.

A vibrator, shown generally at 24, is provided for vibrating hopper 12. The illustrated vibrator is of the type employed in the Model No. ISOG-4104 powder filler, which is commercially available from the Hearth & Andrews Corp. of Wheat Ridge, Co. It should be understood that although this particular commercially available vibrator is shown in the illustrated embodiment, any vibrator could be employed as long as it imparts the desired movement of the screen unit 20 relative to the hopper, as will be discussed further below. Vibrator 24 includes a main housing 26 which contains a motor and associated electrical apparatus, a mounting bracket 28 whose upper face is suitably mounted to the lower end of hopper 10, flexible members as shown at 30 which operably connect mounting bracket 28 to main housing 26, a drive link shown only schematically at 32 which is operably connected to mounting bracket 28, and support legs as shown at 34. As should be apparent vibrator 24 is not connected to screen unit 21. Reciprocation of drive link 32 serves to reciprocate or vibrate mounting bracket 28, and thus also hopper 10. Drive link 32 is connected to bracket 28 such that reciprocation thereof functions to impart vibration to hopper 10 which has a horizontal and vertical component. This is desirable over a vibrator whose vibration has only one component, since two component vibration also causes screen unit 21 to move in a direction having two components. As will be more apparent below in connection with the description of apparatus operation, such screen movement achieves optimum breakup of packed areas in the solid particulate. Particles, shown schematically at 36, are shown as being dispensed from hopper 10 so as to pass along chute 18 and into a collection vial 38.

Figure 2:
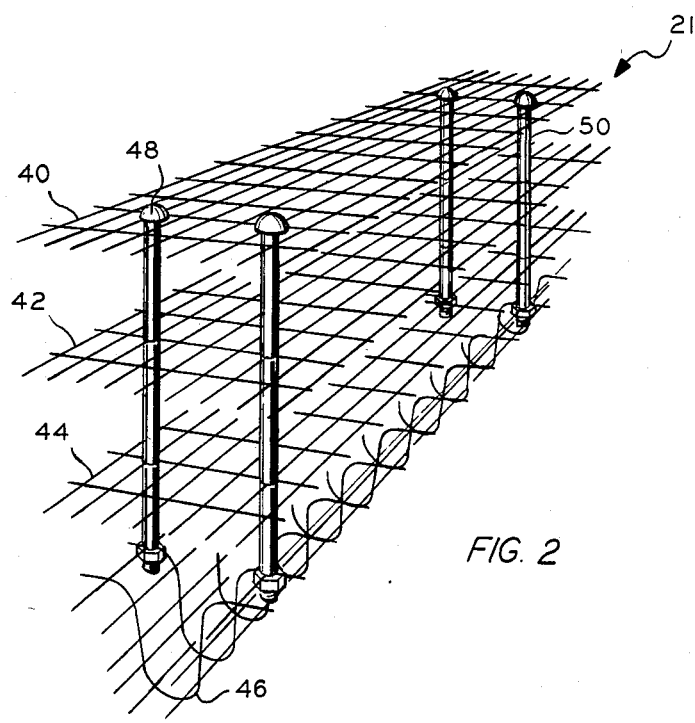
FIG. 2 is a pictorial view of the screen unit shown partially in FIG. 1.

Referring now to FIG. 2, there is shown pictorial view of screen unit 21. In the illustrated embodiment, the screen unit 21 includes four screen members 40, 42, 44 and 46. Portions of screen members 42, 44 and 46 are shown as being broken away for clarity of illustration, but it should be understood that these screen members are in fact continuous. The screen members are maintained in a fixed, spaced relationship by means of a plurality of bolts as shown at 48 and associated spacer elements as shown at 50. Each bolt passes through each screen member, and passes through three spacer elements. As shown, a spacer element, which essentially comprises a tubular member, is fitted between each screen member so as to separate the screen members from one another. Of course, nuts are suitably provided to tighten the spacer elements against their respective screen members. Although four screen members are shown in the illustrated embodiment, it should be apparent that any number could be employed. Increasing the number of screen members employed will generally enhance the free flow of particles through the hopper, but will undesirably decrease the hopper capacity somewhat, and could also increase the resistance of the screen unit to desired movement within the bed of solid particulate in the hopper.

As shown, screen members 40, 42 and 44 are generally planar, and rectangularly shaped, and are substantially parallel to one another. Screen member 46 has a generally curved and somewhat parabolic shape so as to extend from opposite edges generally downward to a lowermost vertex. This shape allows for the lowest possible extension of the screen member into the interior of hopper 10, as will be seen in FIGS. 3 and 4, where packing of solid particles is most severe, and thus where plugging of the hopper is most apt to occur.

Each screen member shown in FIG. 2 most preferably comprises widely available wire mesh made from interwoven metallic wires which form holes large enough to permit flow of particles therethrough, but small enough to serve a sifting function in preventing excessively large particles from passing through the screen. Typically, the holes formed by the screen wires are no more than about 1/16 inch in diameter, and are not necessarily drawn to scale in the figures.

Referring now to FIG. 3, a cross-sectional view of hopper 10 and screen unit 21 disposed therein is shown. The interior surface of hopper 10 defines a cavity 52 therein in which screen unit 21 is disposed so as to be enclosed by the lower portion of the hopper and so as to be unattached to the hopper. More specifically, screen unit 21 is connected to no other member. As shown, the screen members are vertically stacked one upon the other. Also as shown, screen member 46 extends downwardly from opposite edges to a lowermost position in cavity 52 near the lower end of hopper 10 where particle packing problems can become most severe. Screen member 46 is further adapted to rest upon the interior surface of hopper 10 so as to be in contact therewith adjacent the hopper lower end when hopper 10 is empty and upright as shown. Additionally, the width of each screen member as measured between opposite longitudinally extending edges thereof is less than the width of cavity 52. Thus, screen unit 21 is free to move relative to hopper 10 in a horizontal or lateral direction. It can also be seen from FIG. 3 that screen unit 21 generally conforms to the shape of the hopper interior surface, and that the total height of the screen unit is less than the total height of the cavity 52 so as to permit movement of screen unit 21 relative to the hopper in a vertical direction.

Referring now to FIG. 4, a longitudinal cross-sectional view of hopper 10 and screen unit 21 is shown. Screen members 40, 42 and 44 can be seen to be generally horizontally disposed. Also, the length of each screen member can be seen to be less than the length of cavity 52, thus permitting movement of screen unit 21 relative to the hopper in a horizontal or longitudinal direction.

Operation of the above described apparatus will now be explained. Hopper 10 is the first at least partially filled with a solid particulate to be dispensed. It may be desirable to initiate operation of vibrator 24 before filling of the hopper such that movement of the screen unit 21 therein assists the particles to flow downward through the screen members so as to flow to the bottom of the hopper, as will become more apparent below. If the hopper 10 is filled with solid particulate and the screen members are stationary, the particles may tend to simply accumulate on the top screen member.

As noted above, vibration imparted to hopper 10 has a vertical component and a horizontal component, the horizontal component in this case being generally longitudinal in direction with respect to the hopper. The direction of this vibrational motion is schematically indicated at 54 in FIG. 1. Since screen unit 21 is free to move vertically and horizontally due to its shape and size as discussed above, vibration of hopper 10 in the direction indicated will cause screen unit 21 to move relative to hopper 10 both vertically and horizontally (longitudinally) also in the direction indicated at 54 in response to movement or vibration of hopper 10. Typically, the hopper is vibrated at a frequency of about 20 to about 100 cycles per second. Of course, if desired, vibration imparted to hopper 10 could be provided having a lateral horizontal component in addition to the components discussed above so as to cause movement of screen unit 21 relative to the hopper in this additional direction as well.

Since the screen unit 21 moves or vibrates relative to hopper 10 in response to vibration of the hopper, screen unit 21 therefore also moves relative to particles in the hopper. This movement relative to the solid particles produces a shearing and/or stirring action which tends to break up packed areas in the bed of particulate in the hopper and thus maintain free and continuous particle flow through the hopper. Thus, providing a screen unit according to the present invention minimizes particle packing problems so as to also allow the use of a larger capacity hopper wherein greater particle weight enhances particulate packing.

As shown, solid particles flow from outlet 16, down chute 18, and into vial 38. By way of example, vial 38 might be continuously weighed during dispensing, dispensing being terminated when the desired weight is reached. Of course, the dispensing apparatus described can be employed to dispense particles for any purpose and in any environment.

Other advantages reside in the combination of the screen unit and hopper according to the invention. For example, since screen unit 21 is unattached to hopper 10, screen unit 21 can be easily and conveniently removed from the hopper for cleaning. In addition, the screen members serve as sifters so as to prevent excessively large particles from flowing out outlet 16.

Obviously many modifications and variations of the present invention are possible in light of the above teachings. It is therefore to be understood that within the scope of the appended claims the invention may be practiced otherwise than as specifically described.

That which is claimed is:

1. An apparatus for dispensing solid particles comprising:
   a hopper for containing the solid particles having an upper end, a lower end, and an interior surface which defines an interior cavity therein, said hopper having an outlet opening near said lower end and said hopper further having a larger cross-section at said upper end than at said lower end;
   a screen unit, unattached to said hopper or any other member, which comprises a plurality of vertically stacked screen members of interwoven mesh disposed in said cavity so as to be enclosed by at least a portion of said hopper and so as to be capable of movement relative to said hopper in vertical and horizontal directions in response to movement of said hopper, and which further comprises a spacer means for maintaining said screen members in a fixed, spaced relationship, wherein said plurality of screen members includes a plurality of substantially parallel, horizontally disposed planar screen members and a curved bottom screen member which extends generally downward to said hopper lower end and which is adapted to rest said hopper interior surface so as to be in contact therewith adjacent said hopper lower end when said hopper is empty and upright; and
   vibrating means for vibrating said entire hopper, whereby said hopper vibrates relative to said screen unit and whereby solid particles are dispensed out of said outlet opening.

2. An apparatus as recited in claim 1, wherein said screen unit is shaped to generally conform to the shape of said hopper interior surface.

3. An apparatus as recited in claim 2, wherein said vibrating means is adapted to impart said hopper vibration which has a horizontal component and a vertical component.

* * * * *

UNITED STATES PATENT AND TRADEMARK OFFICE
CERTIFICATE OF CORRECTION

PATENT NO. : 4,684,041

DATED : 8/4/87

INVENTOR(S) : Ronald D. Jones et al

It is certified that error appears in the above-identified patent and that said Letters Patent is hereby corrected as shown below:

Column 6, claim 1, line 12, insert ---upon--- after "rest".

Signed and Sealed this

Twenty-third Day of February, 1988

Attest:

DONALD J. QUIGG

*Attesting Officer*  Commissioner of Patents and Trademarks